US011155160B2

(12) United States Patent
Romack et al.

(10) Patent No.: US 11,155,160 B2
(45) Date of Patent: Oct. 26, 2021

(54) DISCONNECT CLUTCH FOR A TANDEM AXLE ASSEMBLY (71) Applicant: LINAMAR CORPORATION, Guelph, MI (US)

(72) Inventors: Carl M. Romack, Ann Arbor, MI (US); John Castellano, Farmington Hills, MI (US); Thomas Reedy, South Lyon, MI (US); Todd Ekonen, Brighton, MI (US); Jochen Wolkenstein, Boebingen (DE); Konrad O. Bachmann, Stuttgart (DE); Kenneth J. Stamper, Clinton Township, MI (US); Christian Krajewski, Neuhausen (DE)

(73) Assignee: Linamar Corporation, Guelph (CA)

( * ) Notice: Subject to any disclaimer, the term of this patent is extended or adjusted under 35 U.S.C. 154(b) by 0 days.

(21) Appl. No.: 16/463,449

(22) PCT Filed: Nov. 22, 2017

(86) PCT No.: PCT/US2017/062929
§ 371 (c)(1),
(2) Date: May 23, 2019

(87) PCT Pub. No.: WO2018/098217
PCT Pub. Date: May 31, 2018

(65) Prior Publication Data
US 2019/0351761 A1 Nov. 21, 2019

Related U.S. Application Data (60) Provisional application No. 62/425,850, filed on Nov. 23, 2016.

(51) Int. Cl.
*B60K 17/02* (2006.01)
*B60K 17/36* (2006.01)
(Continued)

(52) U.S. Cl.
CPC .............. *B60K 17/02* (2013.01); *B60K 17/36* (2013.01); *F16C 19/305* (2013.01);
(Continued)

(58) Field of Classification Search
None
See application file for complete search history.

(56) References Cited

U.S. PATENT DOCUMENTS

| 2,400,835 | A | * | 5/1946 | Levin | ...................... | F16D 13/52 |
| | | | | | | 74/665 K |
| 2014/0124320 | A1 | * | 5/2014 | Cooper | ................... | F16D 13/54 |
| | | | | | | 192/20 |
| 2015/0275986 | A1 | * | 10/2015 | Cooper | ................... | F16D 13/54 |
| | | | | | | 192/20 |

FOREIGN PATENT DOCUMENTS

| EP | 1548313 | 6/2005 |
| FR | 765330 | 6/1934 |

(Continued)

*Primary Examiner* — Colby M Hansen
(74) *Attorney, Agent, or Firm* — Miller Canfield (57) ABSTRACT A clutch assembly includes a clutch hub, a clutch drum disposed about the clutch hub, a first gear connected to the clutch drum, the first gear configured to be coupled with a first shaft, the clutch hub configured to be coupled with a second shaft, a clutch pack disposed between the clutch hub and the clutch drum, and an air-actuated piston assembly for selective actuation of the clutch pack to connect or disconnect two drive axles in a tandem axle assembly. The clutch assembly includes a plurality of lever arms disposed between the piston assembly and the clutch pack. Each lever arm extending to engage the piston and the clutch pack. Each lever arm may be pivotally mounted to a lever carrier plate or to a fixed portion of the piston housing.

14 Claims, 10 Drawing Sheets (51) Int. Cl.
*F16C 19/30* (2006.01)
*F16D 13/52* (2006.01)
*F16D 13/58* (2006.01)
*F16D 13/70* (2006.01)
*F16D 23/12* (2006.01)
*F16C 33/46* (2006.01)

(52) U.S. Cl.
CPC .......... *F16C 33/4676* (2013.01); *F16D 13/52* (2013.01); *F16D 13/58* (2013.01); *F16D 13/70* (2013.01); *F16D 23/12* (2013.01); *F16D 2023/126* (2013.01)

(56) References Cited

FOREIGN PATENT DOCUMENTS

| | | |
|---|---|---|
| FR | 927347 | 10/1947 |
| WO | 2015164646 | 10/2015 |

\* cited by examiner

DISCONNECT CLUTCH FOR A TANDEM AXLE ASSEMBLY

CROSS-REFERENCE TO RELATED APPLICATIONS

This application claims priority to U.S. provisional patent application No. 62/425,850, filed Nov. 23, 2016.

FIELD

The present disclosure relates to a clutch system for connecting and disconnecting one driven axle to another driven axle in a vehicle, such as a pair of driven axles in a tandem axle assembly.

BACKGROUND

Heavy-duty vehicles such as trucks and tractor trailers typically include a tandem axle assembly in which one or both axles are selectively driven. An inter-axle differential unit may be used to split power between the first and second driven axles. With two wheels on a front axle and a tandem axle with two driven axles at the rear of the vehicle, the vehicle is in a 6×4 drive configuration. Other disconnect assemblies may be provided to lock out the second driven axle of the tandem axle assembly. By disconnecting the second axle, a 6×2 drive configuration is provided, to reduce parasitic losses and improve fuel economy for long distances.

SUMMARY

According to one embodiment there is provided a clutch assembly including a clutch hub; a clutch drum disposed about the clutch hub; and a first gear connected to the clutch drum. The first gear is configured to be coupled with a first shaft and the clutch hub is configured to be coupled with a second shaft. The clutch assembly includes a clutch pack disposed between the clutch hub and the clutch drum and an air-actuated piston assembly for selective actuation of the clutch pack to engage the clutch hub and the clutch drum. The piston assembly includes a piston housing and a piston disposed within housing. The clutch assembly includes a plurality of lever arms disposed between the piston assembly and the clutch pack with each lever arm extending to engage the piston and the clutch pack.

In some embodiments, each lever arm has an outer pivot portion, a toe portion, and a knee portion between the pivot portion and the toe portion. The toe portions engage the piston and the knee portions engage the clutch pack.

In some embodiments, the clutch assembly includes a lever carrier plate mounted adjacent to the clutch pack and rotatable with the clutch drum. The pivot portion of each lever arm is pivotally mounted to the lever carrier plate and each lever arm toe portion extends radially inward to engage the piston. The toe portions may engage the piston via first clutch bearing such as a thrust bearing. The clutch assembly may be part of a drive axle assembly with an input shaft having a second gear coupled to the first gear of the clutch assembly; and a power transfer shaft coupled to the clutch hub.

In other embodiments, the clutch assembly includes a fixed frame defining the piston housing and the pivot portion of each lever arm is pivotally mounted to an outer portion of the piston housing. The knee portions of the lever arms may engage a clutch pack of the clutch assembly via a second clutch bearing such as an annular needle roller thrust bearing. The clutch assembly may be part of a drive axle assembly with an input shaft coupled to the clutch hub and a power transfer shaft having a second gear coupled to the first gear of the clutch assembly.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure is directed to a clutch assembly for a first driven axle of a tandem axle assembly of a vehicle. The clutch assembly enables the complete disconnect of the second driven axle in a 6×4 vehicle to provide a 6×2 drive configuration for the vehicle which may be suitable and used for most driving events, thus improving long distance fuel economy. The clutch assembly may be dimensioned to replace an interaxle differential unit and housed within the first driven axle assembly. The clutch assembly includes an air-actuated piston assembly and a plurality of lever arms configured to cause the clutch to engage and transmit torque to the second driven axle.

Figure 1:
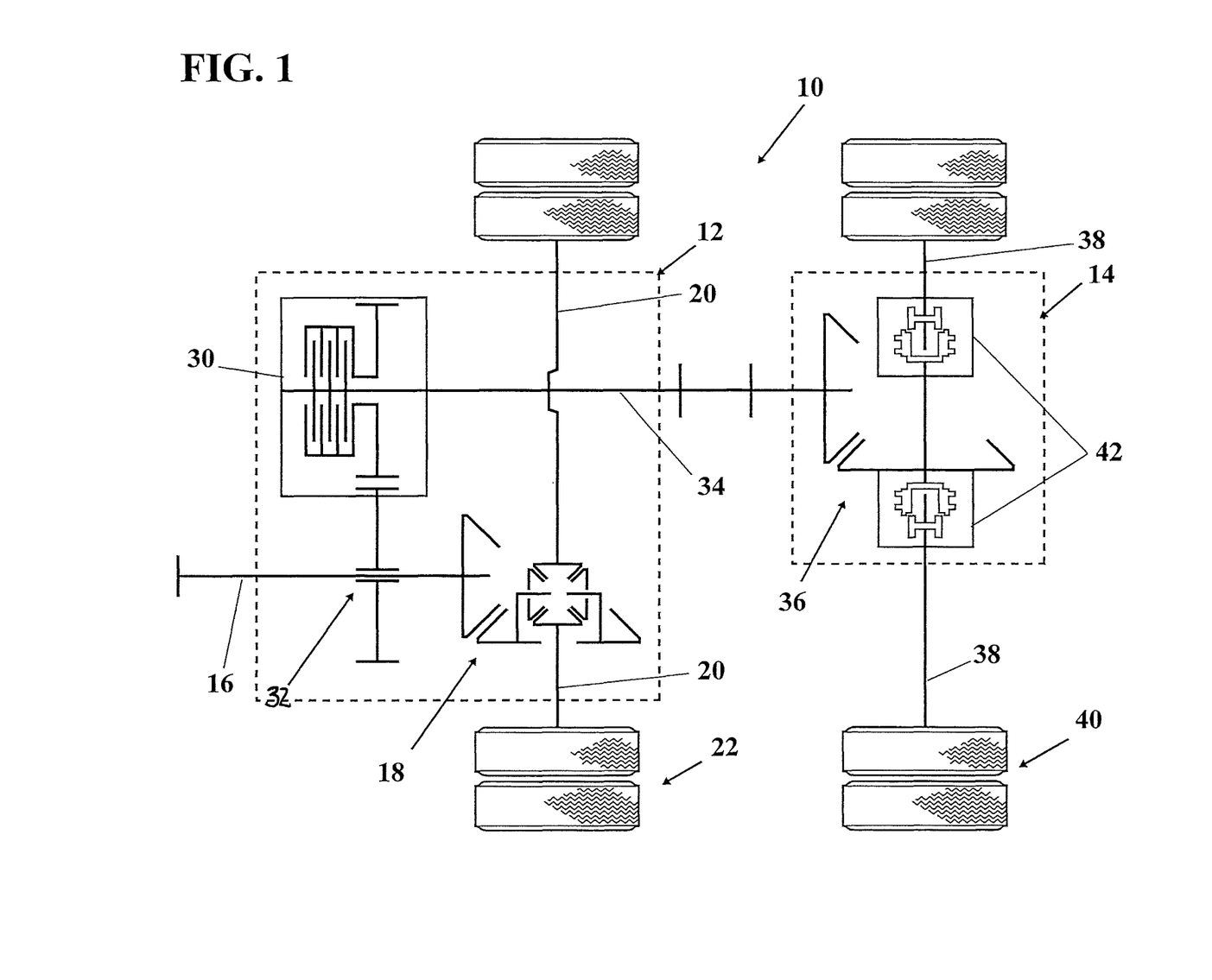
FIG. 1 illustrates a power flow diagram for a clutch assembly and two driven axles of a vehicle in a first configuration.

FIG. 1 illustrates a power flow diagram for a tandem axle assembly 10 of a vehicle in a first configuration. The tandem axle assembly 10 includes a first drive axle 12 and a second drive axle 14. Power from the vehicle is received through a first shaft, specifically an input shaft 16, to a first differential 18 which drives two output shafts 20 for a first set of wheels 22. In one embodiment, a clutch assembly 30 according to the present disclosure is coupled through a set of gears 32 to the input shaft 16 to transmit torque to a second shaft. Specifically, in this embodiment, the second shaft is a power transfer shaft 34 connected to the second drive axle 14. When the clutch assembly 30 is engaged or actuated, torque from the input shaft is transmitted by the clutch assembly 30 to the power transfer shaft to drive a second differential 36. The second differential 36 drives two output shafts 38 for a second set of wheels 40. The second drive axle may include additional disconnect units or clutches 42 to decouple each set of left and right wheels from the second differential. When the clutch assembly 30 is not engaged, and when each of the left and right wheels 40 of the second drive axle 14 are disconnected from the second differential 36, the gears in the second differential 36 no longer rotate and energy losses are reduced. A vehicle controller (not shown) is typically in communication with each of the components noted above to sense and control the connection states and drive configuration of the vehicle. The vehicle controller also receives information from one or more sensors (not shown).

FIGS. 2 to 6B illustrate one embodiment of the clutch assembly 30. The clutch assembly 30 is coupled through the set of gears 32 to the input shaft for the tandem axle assembly 10. The set of gears 32 includes a driver gear 48 mounted to the input shaft and operatively coupled with a driven gear, specifically, a first gear 50 of the clutch assembly 30. In one embodiment, the driver gear 48 and driven or first gear 50 are helical gears. The first gear 50 is connected to a clutch drum 60 and in one embodiment, the first gear 50 is welded to the clutch drum 60. Thus, the first gear 50 and clutch drum 60 are coupled with the first shaft or input shaft 16 and rotate during any operation of the vehicle which provides power to the input shaft 16.

The first gear 50 and clutch drum 60 are disposed about a clutch hub 62. The clutch hub 62 is configured to be coupled with the second shaft, the power transfer shaft 34. The power transfer shaft 34 (not shown in FIGS. 2 to 6B) extends from the clutch assembly 30 to the second drive axle 14 of the tandem axle assembly 10. In one embodiment, the clutch hub 62 is connected to the second shaft via axial splines 64. In one embodiment, the clutch hub 62 and second shaft 34 are offset from and substantially parallel to the input shaft 16. The first gear 50 and clutch drum 60 may be disposed about the clutch hub 62 with the clutch drum 60 radially adjacent and fixed to the first gear 50. When the clutch assembly 30 is not engaged, the first gear 50 and clutch drum 60 rotate about the clutch hub 62. The first gear 50 and clutch drum 60 are supported about the clutch hub 62 by multiple bearings. In one embodiment, the bearings include two axial thrust bearings 66 and a radial roller bearing 68.

A clutch pack 70 is housed between the clutch drum 60 and an outer diameter 74 of the clutch hub 62. The clutch pack 70 consists of a set of annular friction plates 78 connected to or carried by the clutch hub 62 and a set of annular separator plates 80 connected to or integrated into the clutch drum 60 and interleaved with the friction plates 78. Specifically, an inner diameter 82 of the clutch drum 60 is splined to engage the outer diameters of the annular separator plates 80. The outer diameter 74 of the clutch hub 62 is splined to engage the inner diameters of the annular friction plates 78. As the clutch assembly 30 is stroked to a closed state, the friction plates 78 become compressed between the separator plates 80. The clutch pack 70 being compressed together forces the rotation of the clutch hub 62 and the power transfer shaft 34 connected to the clutch hub 62. Under these closed or engaged conditions, the tandem axle assembly 10 is in a 6×4 drive configuration. When the clutch pack 70 is opened or disengaged, the clutch hub 62 and the second drive axle 14 are disconnected from the first drive axle 12 and the tandem axle assembly 10 is in a 6×2 drive configuration Closing and opening of the clutch pack 70 is achieved through the actuation of a piston assembly 90 and multiple lever arms 92 which interact with the piston assembly 90 and the clutch pack 70. The piston assembly 90 is actuated by compressed air and includes a piston housing 96 and a piston 98 configured to stroke axially back or forth within the housing. The piston housing 96 is mounted to a frame 100 of the clutch assembly 30. In one embodiment, the piston housing 96 is annular housing with an outer cylindrical wall 102 and an inner cylindrical wall 104 joined by an annular piston floor. The outer and inner walls and the piston floor define a cavity 110 for receiving and retaining the piston 98.

In one embodiment, the piston 98 is an annular piston 98 which is sealed into the piston housing 96 with one or more formed seals. In one embodiment, the piston 98 includes a first seal 114 located between an outer diameter of the piston 98 and an inward facing surface of the outer wall of the piston housing 96. A second seal 116 is located between an inner diameter of the piston 98 and an outward facing surface of the inner wall of the piston housing 96. The piston 98 may consist of first and second portions 118, 120. The first portion 118 extends generally from the inner wall of the piston housing 96 to the outer wall of the piston housing 96 and defines a first piston surface 122 generally parallel to the floor of the piston housing 96 and generally facing the clutch pack 70. The second portion 120 extends radially from the first portion 118 towards the clutch pack 70 and from the inner wall 104 of the piston housing 96 into only a portion of the cavity 110, such that first and second portions 118, 120 create a stepped cross-section.

Figure 5:
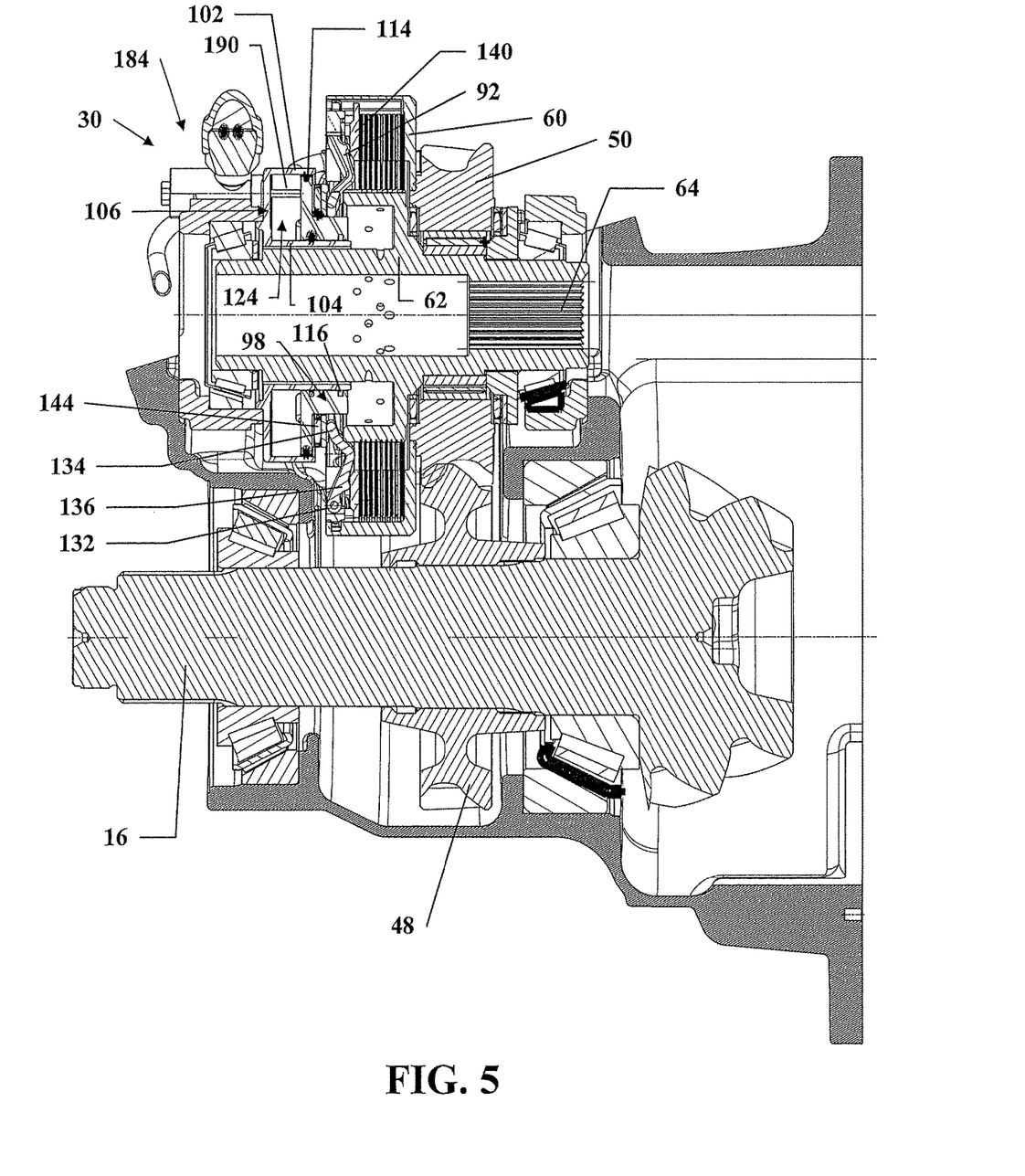
FIG. 5 is a cross-section view of the clutch assembly mounted to the driven axle and with the clutch in an engaged state.

The piston 98 is stroked or actuated through the controlled introduction of compressed air into a chamber 124, as shown in FIG. 5, defined between the piston 98 and the piston housing 96. Compressed air may be delivered from an on-board air supply and delivered to the clutch assembly 30 through a tube 126. The tube connects to a port 128 defined in the piston housing 96. In embodiment, the port 128 comprises a banjo fitting. The control of air and actuation of the piston assembly 90 is controlled by the vehicle controller.

In one embodiment, a plurality of lever arms 92 is disposed between the piston assembly 90 and the clutch pack 70. Each lever arm 92 extends to engage the piston 98 and the clutch pack 70 in order to transfer and multiply the force imparted by the piston 98 to the clutch pack 70. Specifically, in the embodiment shown in FIGS. 2 to 6B, the clutch assembly 30 includes a lever carrier plate 130 mounted adjacent to the clutch pack 70 and rotatable with the clutch drum 60. The lever carrier plate 130 supports a plurality of lever arms 92 which extend from the plate radially and inwardly towards the piston 98.

Each lever arm 92 includes a pivot portion 132 at the outer end of the lever arm 92, a toe portion 134 at an inner end of the arm 92, and a knee portion 136 between the pivot portion 132 and the toe portion 134. The toe portions engage the piston 98 and the knee portions 136 engage the clutch pack 70. Specifically, the pivot portion 132 is pivotally mounted to the lever carrier plate 130, such as with an axle pin 138. The toe portion 134 extends to engage the first piston surface 122. The knee portion 136 of the lever arm 92 is configured to engage the clutch pack 70. Specifically, in one embodiment, the knee portion 136 of the lever arm 92 has a convex profile configured to extend towards and engage the clutch pack 70.

In one embodiment, the lever arms 92 are configured such that a first distance between the pivot portion 132 to the toe portion 134 is three to four times a second distance from the pivot portion 132 to the knee portion 136 of each lever arm 92. The number and diameter of the friction plates 78 and separator plates 80 in the clutch pack 70 are thus configured based on the force multiplication provided by the lever arms 92, the piston apply force (based on the piston area and air pressure from the vehicle air supply), and the torque requirements for the tandem axle assembly 10.

Figure 6A:
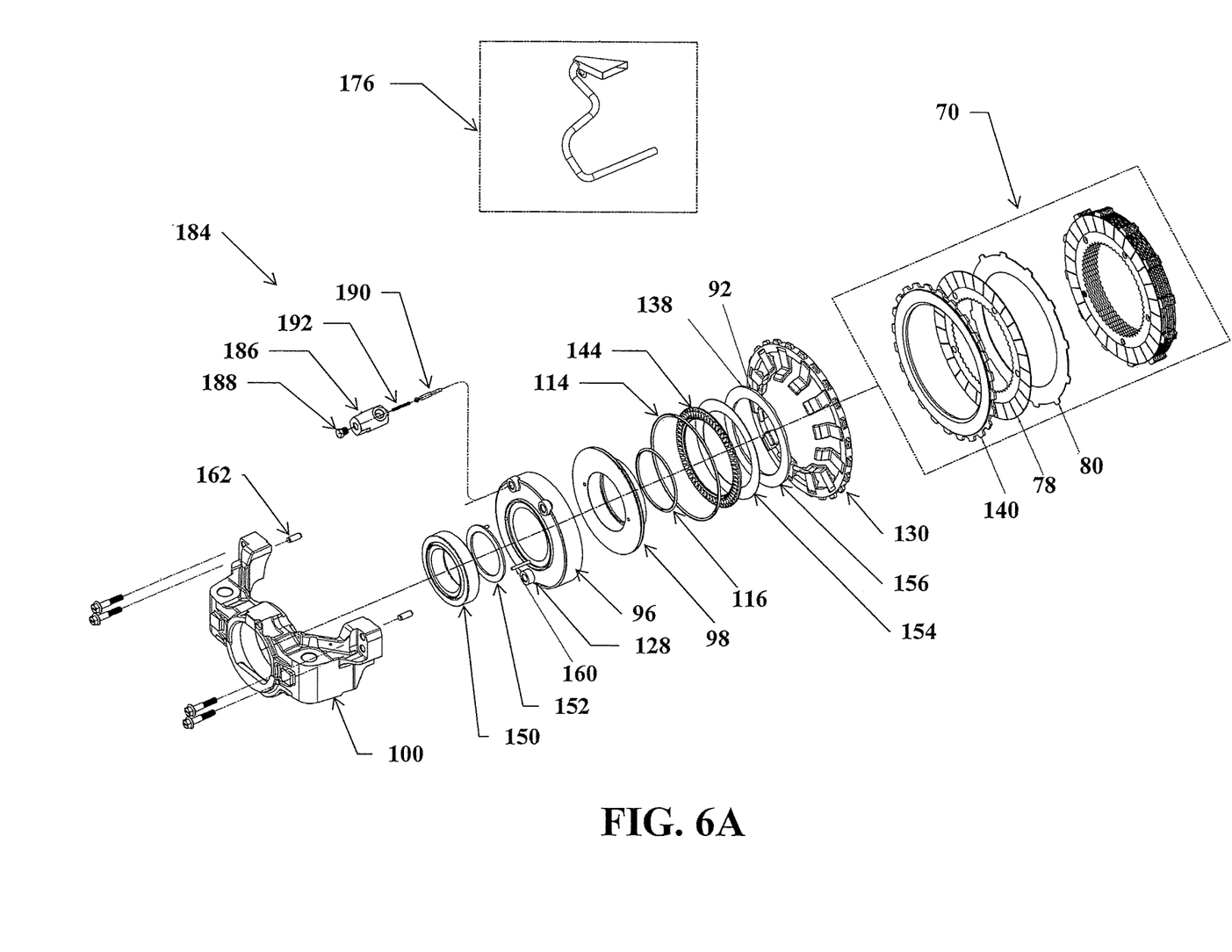
FIGS. 6A and 6B are exploded views of the clutch assembly of FIG. 2.
Figure 6B:
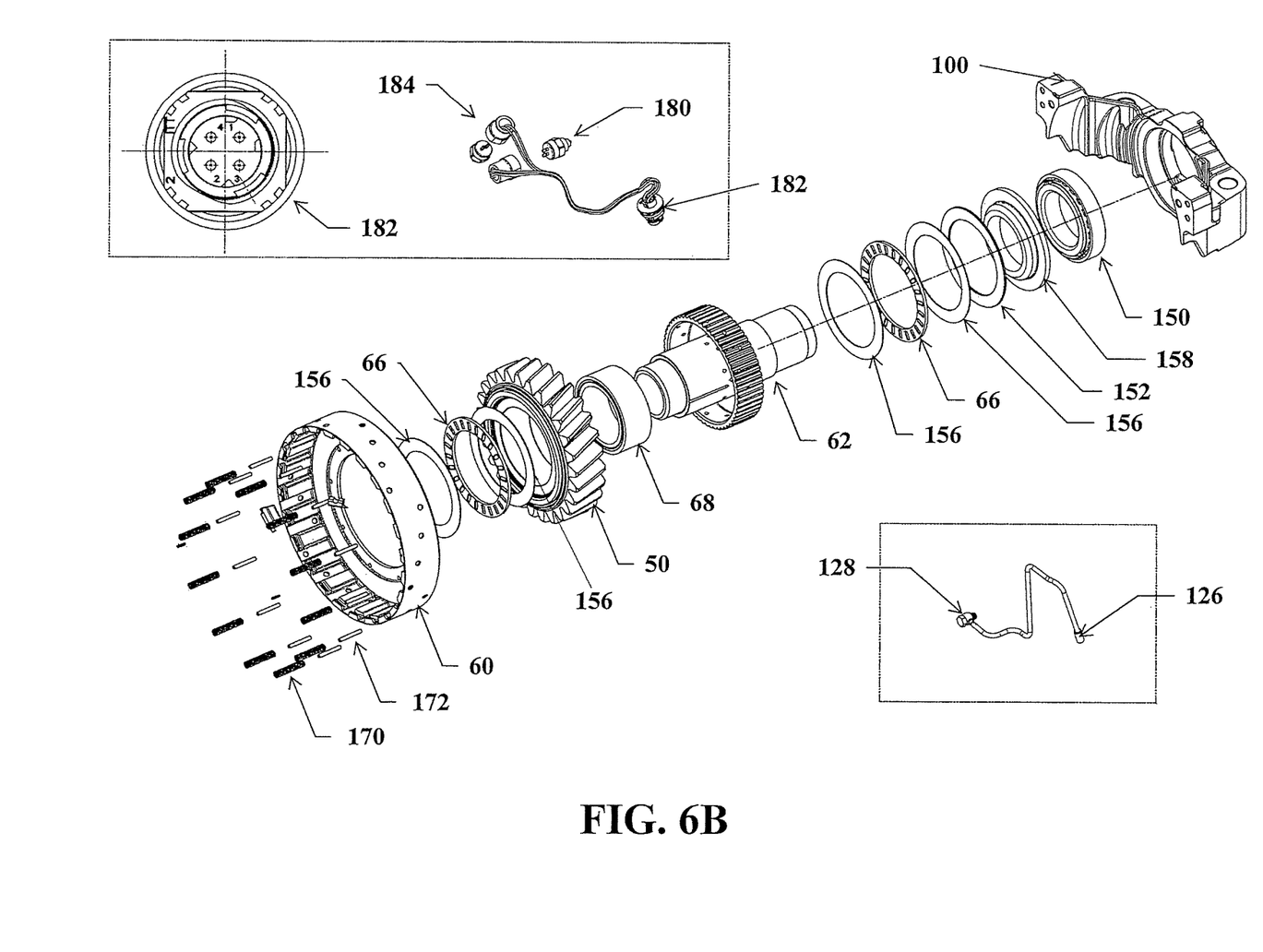
Figure 7:
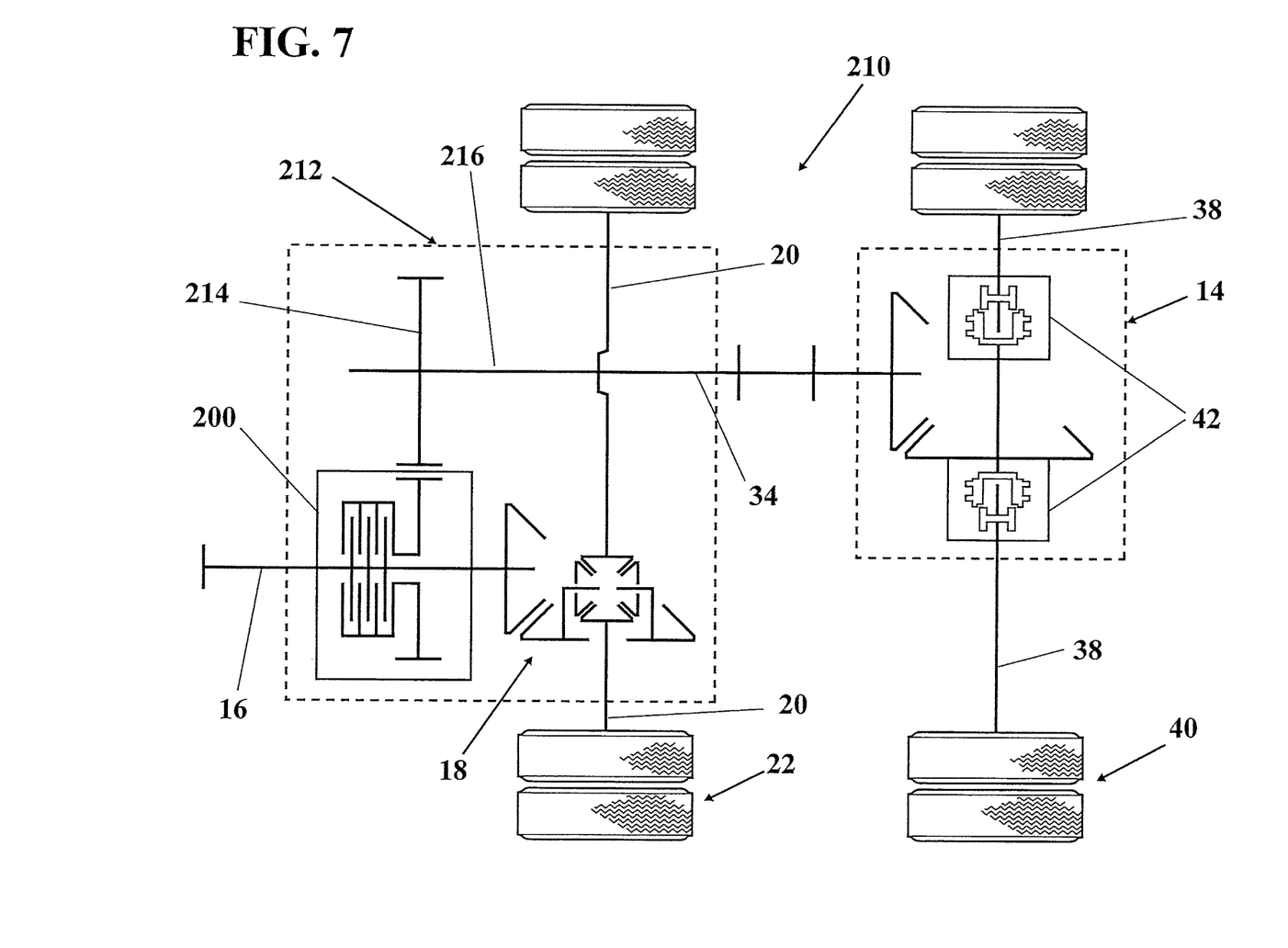
FIG. 7 illustrates a power flow diagram for a clutch assembly and two driven axles of a vehicle in a second configuration.

In one embodiment, the clutch pack 70 includes a clutch pressure plate 140 mounted to the clutch drum 60 and disposed between an outermost friction plate and the lever carrier plate 130. When the piston 98 is actuated, the knee portions 136 of the levers impart the piston force to the clutch pressure plate 140 to engage the clutch assembly 30. In one embodiment, a bearing 144 is disposed between the lever carrier plate 130 and the piston 98. Specifically, the bearing 144 is disposed between the toe portions 134 of the lever arms 92 and the first piston surface 122. In one embodiment, the bearing 144 is an axial thrust bearing. Other components including bearings 150, shims 152, raceways 154, washers 156, and spacers 158 as well as anti-rotation dowels 160 and dowel frames or guides 162 may be included in the clutch assembly 30 as illustrated in FIGS. 6A and 6B. As the clutch assembly 30 is engaged and the lever arms 92 pivot, the toe portions 134 thus slide along the bearing 144 and the knee portions 136 slide along the clutch pressure plate 140.

To disconnect or disengage the clutch pack 70, air is removed or relieved through the port to de-actuate the piston 98 and the piston 98 is forced back to its seated position in the piston housing 96 by a bias means, such as clutch return springs 170. Specifically, in one embodiment, the clutch return springs 170 are housed in the clutch drum 60 and supported by return spring guide pins 172. The clutch return springs are biased to force the clutch pressure plate 144, the lever carrier plate 130 and lever arms 92, and the piston 98 to their disengaged positions.

In some embodiments, oil is used to provide both lubrication and cooling to the clutch assembly 30. The mesh of the gears 48, 50 in FIG. 1 provide hydraulic force and direct the oil. The oil is then allowed to flow through the clutch assembly 30 to lubricate the clutch assembly 30 and also remove heat. As the oil is directed to the clutch drum 60, some of the oil flows to the outer diameter of the clutch drum 60 and exits holes 174. A scoop box and tube assembly 176 may collect and direct this oil down to the clutch hub 62.

The clutch assembly 30 may include one or more switches operating as sensors to detect the position or state of the piston 98 and thus the state of the clutch pack 70. A first switch 180 may be configured in a normally open position and used to detect the piston 98 being deactuated and seated in the piston housing 96. The first switch may be a mechanical plunger switch connected to the vehicle controller through a connector 182 as is known in the art.

Figure 2:
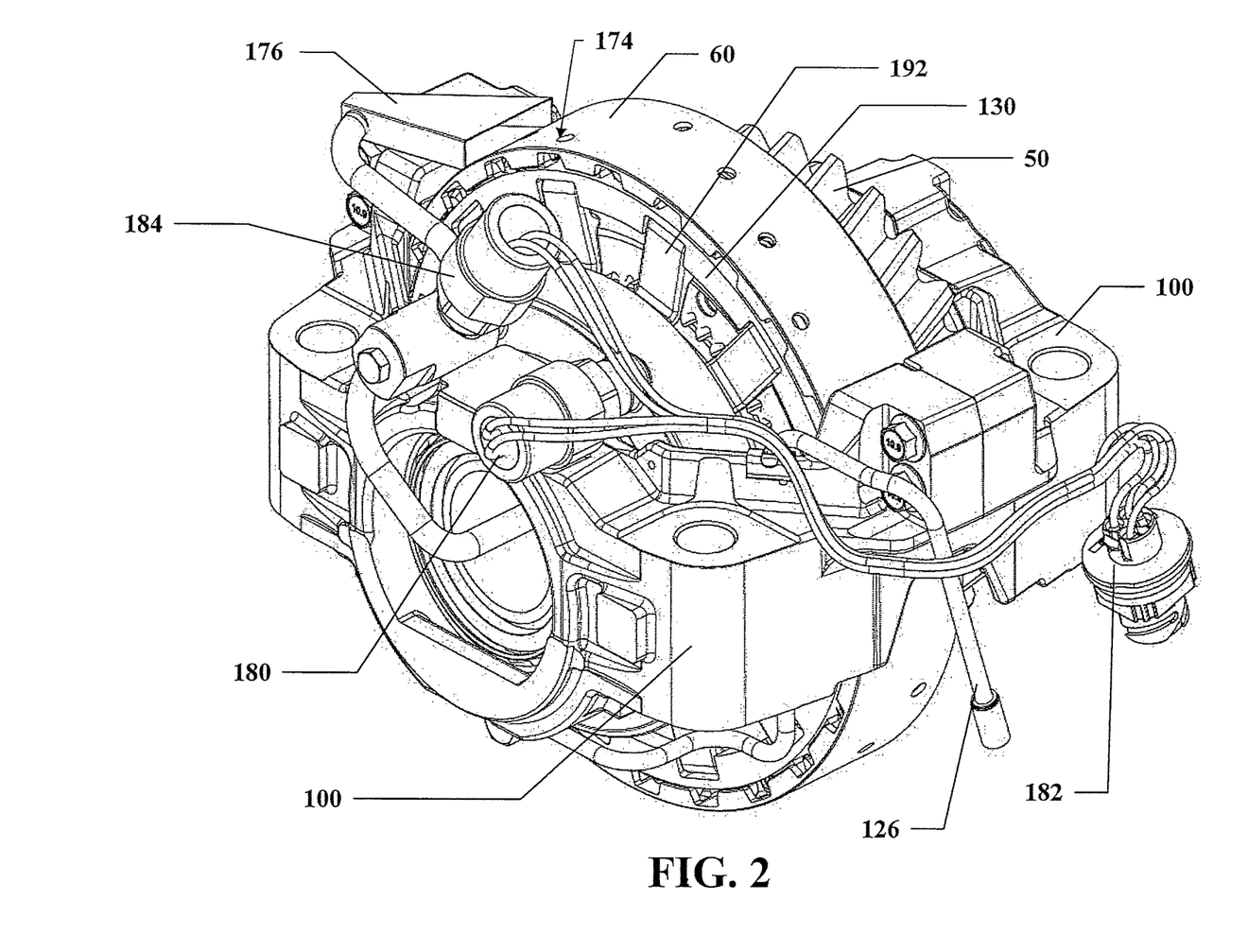
FIG. 2 is a perspective view of the clutch assembly according to one embodiment of the present disclosure.
Figure 3:
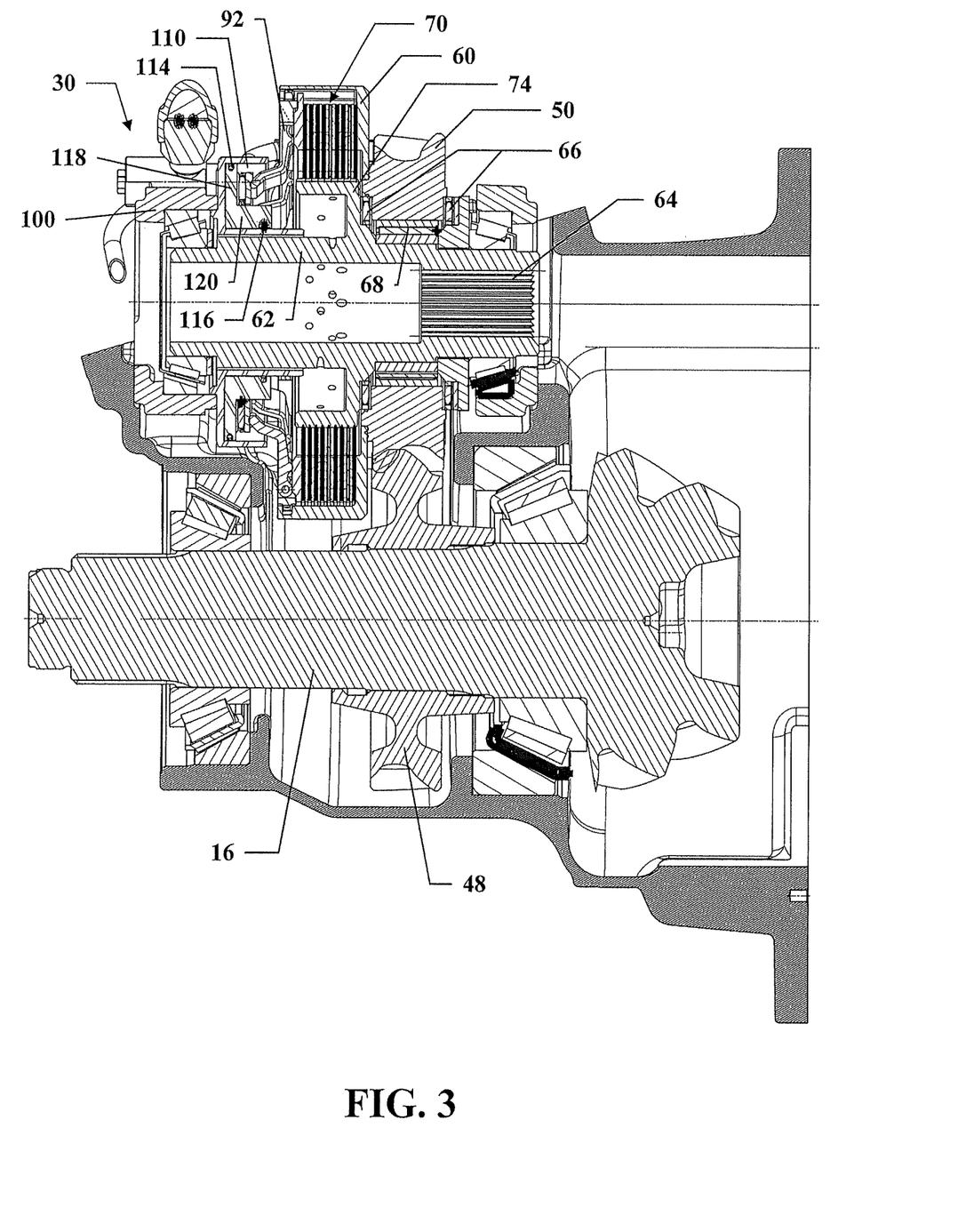
FIG. 3 is a cross-section view of the clutch assembly mounted to a first driven axle and with the clutch in a disengaged state.
Figure 4:
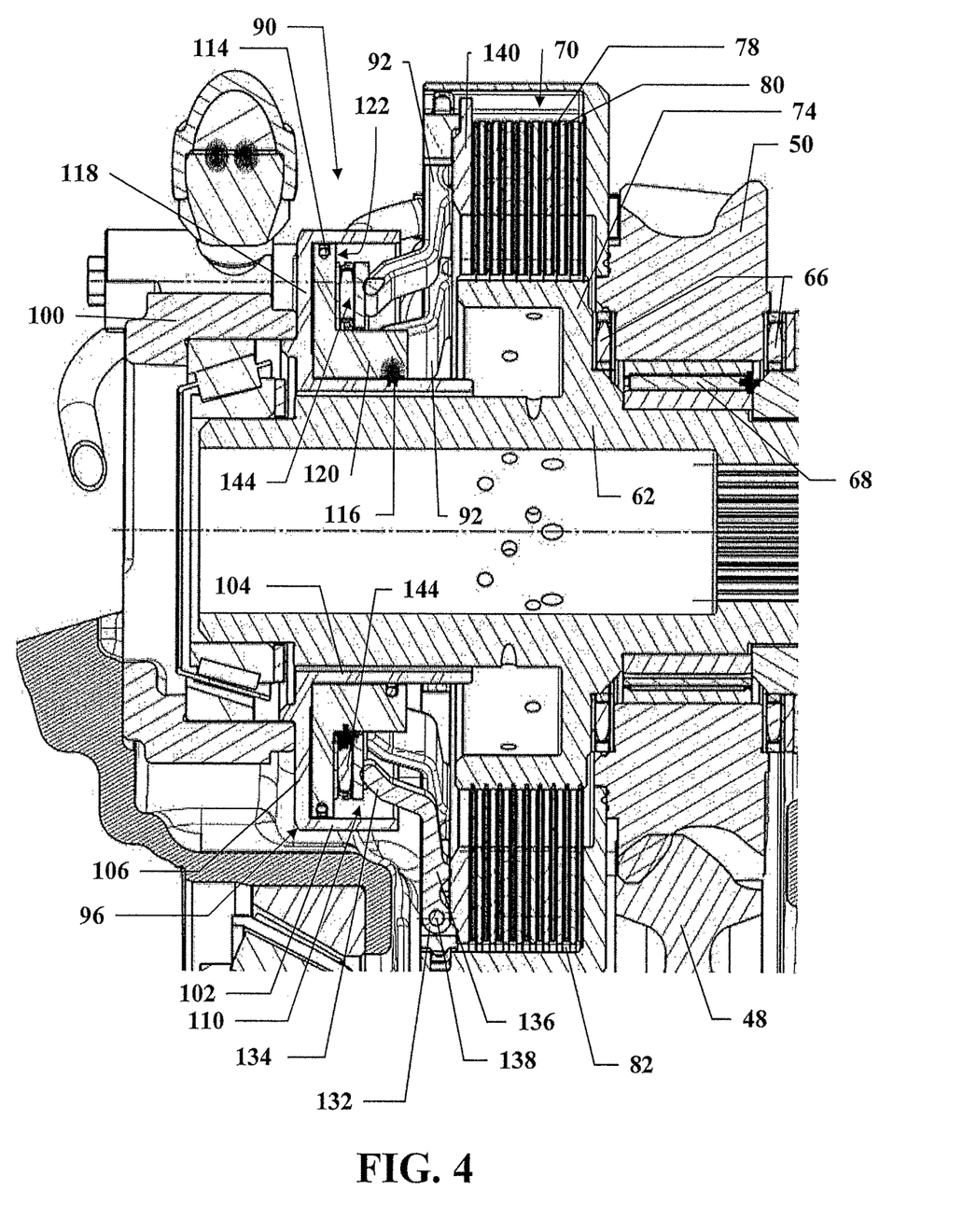
FIG. 4 is an enlarged view of a portion of the clutch assembly of FIG. 3.

A second switch 184 is provided and configured to detect the piston 98 being energized or actuated and moved towards the clutch pack 70 in the fully stroked position. The second switch 184 may be a modified mechanical plunger switch which includes a switch adapter body 186 and sealing plug 188 mounted to the back of the piston housing 96, as illustrated in FIGS. 2 and 6A. The switch adapter body 186 houses a plunger pin 190 and spring 192. The plunger pin 190 is configured with a varying diameter along its length and is configured to stroke with the piston 98. As the plunger pin 190 moves with the piston 98, and reaches the fully stroked position, the second switch 184 is triggered on or to the closed position when the smallest triggering diameter of the plunger pin 190 is detected by the plunger on the second 184 switch. When the piston 98 is deactuated and returns to the piston housing 96, the plunger pin 190 is also forced back to its return position, thereby pushing the plunger pin 190 into the switch and turning off or closing the second switch 184.

FIGS. 7 to 9B illustrate a clutch assembly 200 according to a second embodiment of the present disclosure. As illustrated in the power flow diagram of FIG. 7 for a tandem axle assembly 210, in this embodiment the clutch assembly 200 is mounted to the input shaft or pinion 16 of the first drive axle 212. When the clutch assembly 200 is engaged or actuated, torque from the input shaft 16 is transmitted by the clutch assembly 200 to a power take off shaft 214 which is coupled to an intermediate shaft 216 to drive the second differential 36.

Figure 8:
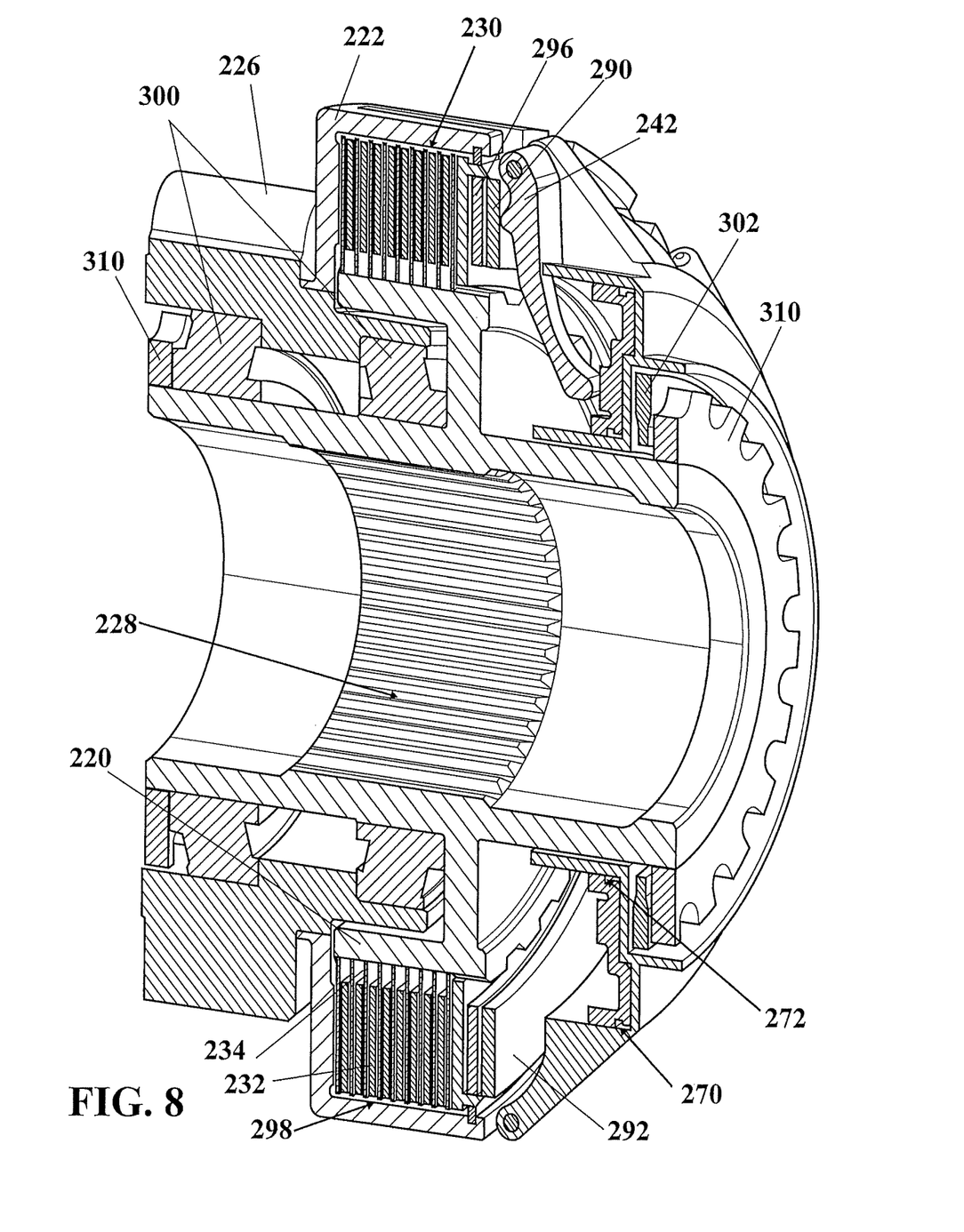
FIG. 8 is a perspective cross-section view of the clutch assembly for two driven axles according to another embodiment of the present disclosure.
Figure 9A:
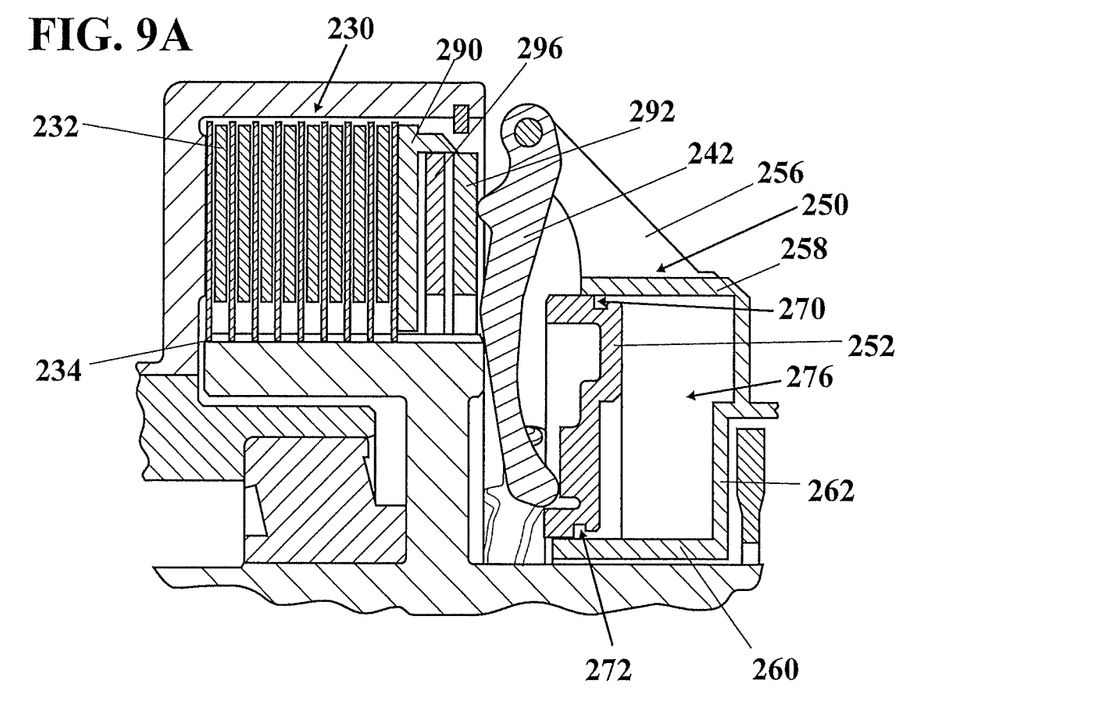
FIGS. 9A and 9B are enlarged views of a portion of the clutch assembly of FIG. 8 in respective engaged and disengaged positions.
Figure 9B:
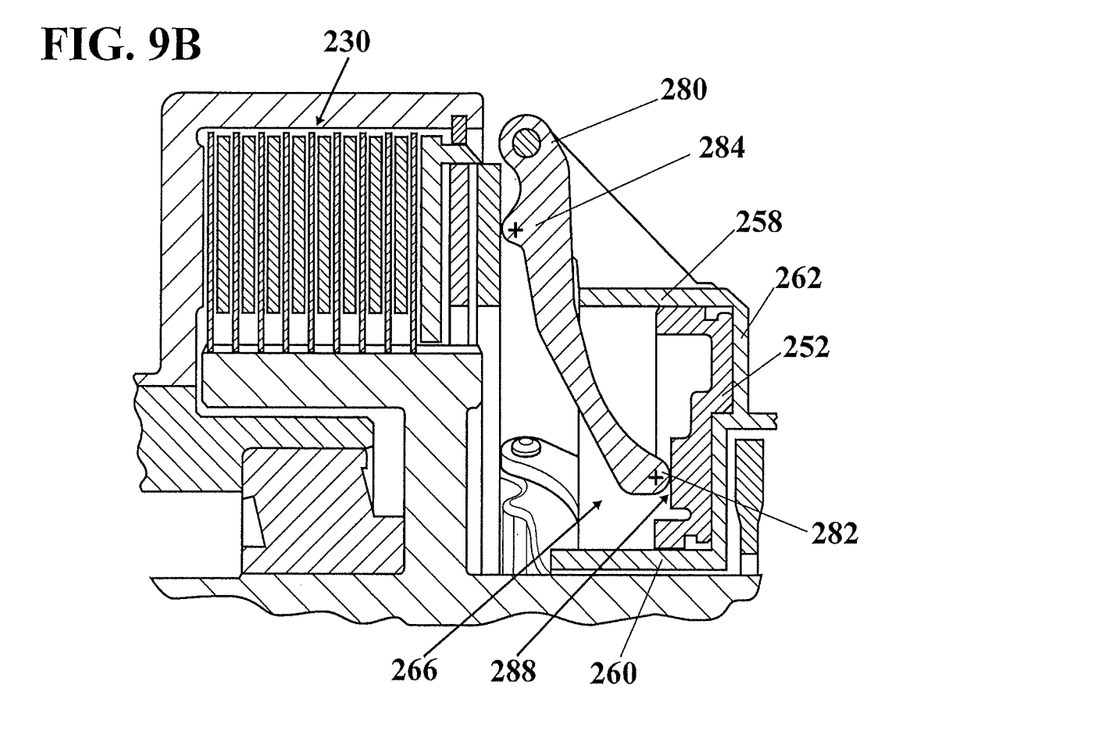

The clutch assembly 200 includes a clutch hub 220 and a clutch drum 222 disposed about the clutch hub 220. A first gear 226 is connected to the clutch drum 222 and is configured to be coupled to the power take off shaft 214. The clutch hub 220 is configured, such as with splines 228, to be coupled to a second shaft. Specifically, in this embodiment, the second shaft is the input shaft or pinion 16 of the first drive axle. Thus, the clutch hub 220 rotates during any operation of the vehicle which provides power to the input shaft 16.

The clutch assembly 200 includes a clutch pack 230 with separator plates 232 connected or mounted to the clutch drum 222 and friction plates 234 connected or mounted to the clutch hub 220, as described above. As the clutch assembly 200 is stroked to a closed state, the clutch pack elements being compressed together forces the clutch drum 222 and first gear 226 to rotate with the clutch hub 220. Under these closed or engaged conditions, the tandem axle assembly 210 is in a 6×4 drive configuration. When the clutch pack 230 is opened or disengaged, the clutch drum 222, first gear 226, power take off shaft 214 and the second drive axle 14 are disconnected from the first drive axle 212 and the tandem axle assembly 210 is in a 6×2 drive configuration In this embodiment, closing and opening the of the clutch pack 230 is achieved through the actuation of alternative embodiments of a piston assembly 240 and lever arms 242 which interact with the piston assembly 240 and the clutch pack 230. The piston assembly 240 is actuated by compressed air and includes a piston housing 250 and a piston 252 configured to stroke axially back or forth within the piston housing 250. The piston housing 250 in this embodiment part of a frame 256 of the clutch assembly 200. A portion of the frame 256 includes outer and inner cylindrical walls 258, 260 joined by an annular piston floor 262 which together define a cavity 266 for retaining the piston 252. The piston 252 and piston housing 250 are fixed radially within the frame 256.

In one embodiment, the piston 252 is an annular piston which is sealed into the piston housing 250 with one or more formed seals. In one embodiment, the piston 252 includes a first seal 270 located between an outer diameter of the piston 252 and an inward facing surface of the outer wall of the piston housing 250. A second seal 272 is located between an inner diameter of the piston 252 and an outward facing surface of the inner wall of the piston housing 250.

The piston 252 is stroked or actuated through the controlled introduction of compressed air into a chamber 276 defined between the piston 252 and the piston housing 250 as described above. A plurality of lever arms 242 is disposed between the piston assembly 240 and the clutch pack 230. Each lever arm 242 includes a pivot portion 280 at the outer end of the lever arm 242, a toe portion 282 at an inner end of the lever arm 242, and a knee portion 284 between the pivot portion and the toe portion. The toe portions 282 engage the piston 252 and the knee portions engage the clutch pack 230.

Specifically, in this embodiment, the pivot portion 280 is pivotally mounted to an outer portion of the radially fixed piston housing 250 and may be configured to rotate with one degree of freedom. The toe portion 282 extends to radially inward to engage a first surface 288 of the piston 252 which faces the clutch pack 230. The knee portion 284 of the lever arm 242 is configured to engage the clutch pack 230. The knee portion 284 may have a convex profile configured to extend towards and engage the clutch pack 230. Again in this embodiment, each lever arm 242 is configured such that a first distance between the pivot portion 280 to the toe portion 282 is three to four times a second distance from the pivot portion 280 to the knee portion 284 of each lever arm 242.

In the second embodiment, the clutch pack 230 includes a clutch pack compression ring 290 disposed between an outermost friction plate and the knee portions 284 of the lever arms 242. The clutch assembly 200 may further include a thrust bearing 292 disposed between the clutch pack compression ring 290 and the knee portions 284 of the lever arms 242. A clutch bearing 296 is disposed between the clutch pack compression ring 290 and the thrust bearing 292. In one embodiment, the clutch bearing 296 is an annular needle roller thrust bearing. Thus, even after the piston 252 is fully stroked and the lever arms 242 are actuated, the clutch bearing 296 allows continuous rotation of the clutch hub 220, clutch drum 222 and first gear 226. The thrust bearing 292 imparts the leveraged piston force directly through the clutch bearing 296 and into the clutch pack compression ring 290. As the clutch assembly 200 is engaged and the lever arms 242 pivot, the toe portions 282 thus slide along the piston 252 and the knee portions 284 slide along the thrust bearing 292.

When air is evacuated to deactuate the piston 252 and disengage the clutch pack 230, embedded axial return springs 298 force the thrust bearing 292 back toward the piston housing 250 thus retracting the lever arms 242 and piston 252. Axial loads resultant from the piston apply stroke are resolved within bearings, which in one embodiment, include two taper roller bearings 300 between the clutch hub 220 and the clutch drum 222 and an annular needle roller bearing 302 between the clutch hub 220 and the piston housing 250.

In one embodiment, the elements of the clutch assembly 200 are retained together via two end nuts 310 which are torqued onto each end of the clutch hub 220. The outer diameters of each end nut may be configured with fluted forms which, as the clutch hub 220 rotates, scoop and throw cooling and lubricating oil of the first driven axle 212, through the clutch assembly 200.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described. The subject matter described herein and in the recited claims intends to cover and embrace all suitable changes in technology.

The invention claimed is:

1. A clutch assembly comprising:
a clutch hub;
a clutch drum disposed about the clutch hub;
a first gear connected to the clutch drum, the first gear configured to be coupled with a first shaft;
the clutch hub configured to be coupled with a second shaft;
a clutch pack disposed between the clutch hub and the clutch drum;
an air-actuated piston assembly for selective actuation of the clutch pack to engage the clutch hub and the clutch drum, the piston assembly having a piston housing and a piston disposed within housing,
a plurality of lever arms disposed between the piston assembly and the clutch pack, each lever arm extending to engage the piston and the clutch pack, wherein each lever arm has an outer pivot portion, a toe portion, and a knee portion between the pivot portion and the toe portion, the toe portions engaging the piston and the knee portions engaging the clutch pack, and wherein
a fixed frame defines the piston housing and the pivot portion of each lever arm is pivotally mounted to an outer portion of the piston housing.

2. The clutch assembly according to claim 1 wherein a first distance from the pivot portion to the toe portion of each lever arm is three to four times a second distance from the pivot portion to the knee portion of each lever arm.

3. The clutch assembly according to claim 1 further comprising:
a lever carrier plate mounted adjacent to the clutch pack and rotatable with the clutch drum,
wherein the pivot portion of each lever arm is pivotally mounted to the lever carrier plate, and
wherein each lever arm toe portion extends radially inward to engage the piston.

4. The clutch assembly according to claim 1 wherein the toe portions of the lever arms engage the piston via a first clutch bearing.

5. The clutch assembly according to claim 4 wherein the first clutch bearing comprises an annular needle roller thrust bearing.

6. The clutch assembly according to claim 1 wherein the clutch pack comprises:
a set friction plates connected to the clutch hub,
a set of separator plates connected to the clutch drum and interleaved with the friction plates, and
a clutch pressure plate disposed between an outermost friction plate and the lever carrier plate, and
wherein the knee portions of the lever arms engage the clutch pressure plate.

7. The clutch assembly according to claim 1 wherein the knee portions of the lever arms engage the clutch pack via a second clutch bearing.

8. The clutch assembly according to claim 7 wherein the second clutch bearing comprises an annular needle roller thrust bearing.

9. The clutch assembly according to claim 1 wherein the clutch pack comprises:
a set friction plates connected to the clutch hub,
a set of separator plates connected to the clutch drum and interleaved with the friction plates, and
a clutch pack compression ring disposed between an outermost friction plate and the knee portions of the lever arms.

10. The clutch assembly according to claim 9 further comprising a thrust ring disposed between the clutch pack compression ring and the knee portions of the lever arms, and wherein the second clutch bearing is disposed between the clutch pack compression ring and the thrust ring.

11. The clutch assembly according to claim 1 wherein an inner surface of the clutch hub is splined to engage the second shaft.

12. The clutch assembly according to claim 1 further comprising a piston sensor having a sensor housing fixed to the piston housing and a plunger pin connected to the piston, the plunger pin varying in diameter along its length and configured to move axially within the sensor housing.

13. A drive axle assembly comprising:
a clutch assembly, the clutch assembly including;
 a clutch hub,
 a clutch drum disposed about the clutch hub,
 a first gear connected to the clutch drum, the first gear configured to be coupled with a first shaft,
 the clutch hub configured to be coupled with a second shaft,
 a clutch pack disposed between the clutch hub and the clutch drum,
 an air-actuated piston assembly for selective actuation of the clutch pack to engage the clutch hub and the clutch drum, the piston assembly having a piston housing and a piston disposed within housing,
 a plurality of lever arms disposed between the piston assembly and the clutch pack, each lever arm extending to engage the piston and the clutch pack, wherein each lever arm has an outer pivot portion, a toe portion, and a knee portion between the pivot portion and the toe portion, the toe portions engaging the piston and the knee portions engaging the clutch pack, and wherein
 a fixed frame defines the piston housing and the pivot portion of each lever arm is pivotally mounted to an outer portion of the piston housing;
an input shaft having a second gear coupled to the first gear of the clutch assembly; and
a power transfer shaft coupled to the clutch hub.

14. A drive axle assembly comprising:
a clutch assembly, the clutch assembly including;
 a clutch hub,
 a clutch drum disposed about the clutch hub,
 a first gear connected to the clutch drum, the first gear configured to be coupled with a first shaft,
 the clutch hub configured to be coupled with a second shaft,
 a clutch pack disposed between the clutch hub and the clutch drum,
 an air-actuated piston assembly for selective actuation of the clutch pack to engage the clutch hub and the clutch drum, the piston assembly having a piston housing and a piston disposed within housing,
 a plurality of lever arms disposed between the piston assembly and the clutch pack, each lever arm extending to engage the piston and the clutch pack, wherein each lever arm has an outer pivot portion, a toe portion, and a knee portion between the pivot portion and the toe portion, the toe portions engaging the piston and the knee portions engaging the clutch pack, and wherein
 a fixed frame defines the piston housing and the pivot portion of each lever arm is pivotally mounted to an outer portion of the piston housing;
an input shaft coupled to the clutch hub; and
a power transfer shaft having a second gear coupled to the first gear of the clutch assembly.

* * * * *